March 12, 1935.  J. BOYKO  1,994,168

AUTOMATIC TROLLING HOOK

Filed Oct. 25, 1934

INVENTOR.
John Boyko
BY
Myron J. Dikeman
ATTORNEY.

Patented Mar. 12, 1935

1,994,168

UNITED STATES PATENT OFFICE 1,994,168

AUTOMATIC TROLLING HOOK

John Boyko, Hamtramick, Mich., assignor of one-half to Wadah A. Koury, Detroit, Mich.

Application October 25, 1934, Serial No. 749,921

3 Claims. (Cl. 43—35)

The object of my invention is to produce a trolling hook for fishing that will automatically release a pair of hidden spring hooks instantly upon being seized by a fish.

Another object is to produce an automatic trolling hook that will operate by outwardly expanding members so that they may be concealed within the trolling body but will instantly expand and seize the fish throat or mouth walls when released.

A further object is to produce an automatic trolling hook that when set for trolling, no engaging hook or projection is exposed so as to engage or become entangled with weeds or other objects while in use.

A still further object is to produce a trolling hook that will resemble a fish, or other object desired for bait, but that will always retain its upright natural position while being drawn through the water.

Another object is to produce an automatic trolling hook that is simple in construction, easily and efficiently operated and can be manufactured at a very low cost.

These several objects are attained in the preferred form by the construction and arrangement of parts as more fully hereinafter set forth.

Similar parts on the drawing are marked by similar numerals or letters.

Figure 2:
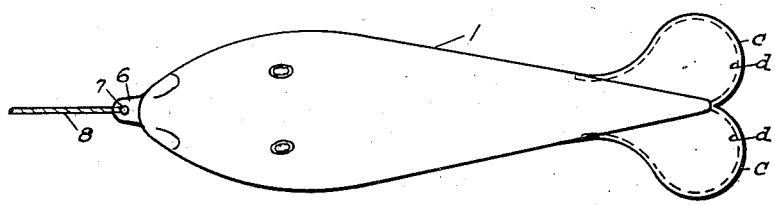
Fig. 2 is a top view of the trolling hook showing the exterior contour of the wood and metal body.

In general, my device comprises a body formed and colored to resemble some object suitable for fish bait, and is herein illustrated as the body of a fish. Beneath the body is mounted a pair of outwardly expanding spring hooks integral with each other fixedly attached to the head end of the body, the hooks being capable of being closed together and engaged inside the tail section of the body, but to be released automatically when seized by a fish, allowing the spring hooks to instantly expand and engage in the fish throat or mouth walls.

I will now describe more fully the detail construction of my device, referring to the drawing and the marks thereon.

Figure 1:
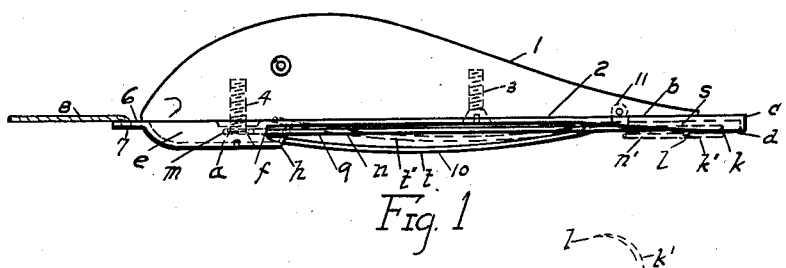
Fig. 1 is a side view of the assembled trolling hook showing the general arrangement of the working parts.
Figure 3:
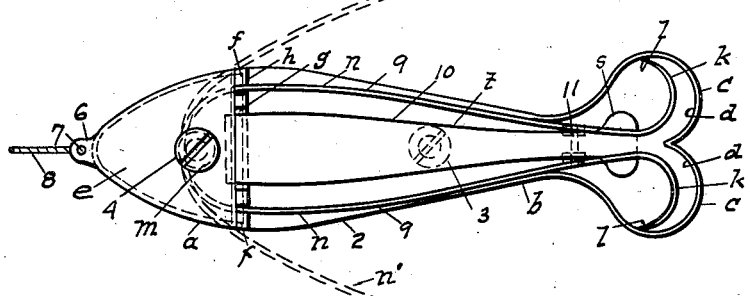
Fig. 3 is a bottom view of the trolling hook showing the relative position of the operating members.

The fish body 1 is preferably made of wood of some firm, strong fiber, but as light as possible for causing the trolling hook to readily float on the water. The outer contour of the body is formed to resemble as nearly as possible the body of some fish, and preferably painted corresponding colors. The bottom of the body 1 is made flat, and retains thereon a metal plate 2, preferably of very thin, strong, light metal such as aluminum, or any other suitable metal, and is fixedly attached to the body 1 by the screws 3 and 4. The base plate 2 is formed with a depressed head section $a$ and an approximately flat tail section $b$, both head and tail sections being designed to conform to the exterior lines of the fish body, the tail section $b$ being extended to form a double tail fin $c$ and is provided with an exterior rim flange $d$ around the outer edge thereof. The head section $a$ being slightly depressed forms a thin chamber $e$ therein, and is provided with edge recesses $f$ and a center recess $g$ formed through the inside edge wall $h$. The head section $a$ is also extended at the front edge by a small tab 6 which is provided with a whole 7 suitable for receiving therein the trolling line 8. Within the chamber $e$ of the depressed head section $a$ is mounted the coiled end $m$ of the spring expanding hooks 9, and is securely attached therein by the screw 4 which passes through both body 1 and base plate 2 and engages the coil as shown in the Fig. 1 of the drawing. The spring hooks 9 are preferably made of a strong fine steel wire, coiled at the center for receiving the attaching screw 4 therein, and with the arms $n$ extended on both sides having outwardly disposed hook ends $k$ formed thereon, both hooks $k$ terminating in sharp points $l$. The arms $n$ are extended through the edge recesses $f$ of the inside edge wall $h$ of the head section $a$, and which retains the double spring hook arms in a plane parallel to and adjacent to the lower surface of the plate section $b$, the hook arms $n$ being capable of being depressed into the closed position beneath the plate 2, sufficiently for the hook ends $k$ to fall within the tail fin flanges $d$ of the tail section $c$ as shown in the Fig. 3 of the drawing, and engaging therewith for holding the double hooks in a fixed trolling position, the hook points $l$ being completely covered and protected. Mounted on the under side of the section $b$ of the plate 2 near the tail end thereof, is a hinged trip bar 10, pivotally attached to the plate 2 by the hinge joint 11, as indicated in Figs. 1 and 3, but may be of any suitable structure. The trip bar 10 is preferably made of a thin, rigid metal sheet, formed with a short lever end $s$ positioned to fit flat against the lower surface of the plate 2 and beneath the hook ends $k$ when said hooks are in their closed position as indicated in Fig. 3, the long lever arm $t$ being curved away from the plate 2 on the opposite side of the hinge 11 and extended with its outer end projected through the center recess $g$ of the wall $h$ at the head section end. The lever end $t$ being free to move within said recess $g$ when pressed against the bottom plate 2, as indicated by the dotted lines $t'$ of Fig. 1, thus raising the short lever end $s$ and also raising the hook ends $k$ therewith, automatically releasing the double hook arms $n$ which will instantly expand outwardly to the extended position as indicated by the dotted lines $n'$ as shown in Fig. 3.

In using my trolling hook, the double spring hook arms $n$ are easily pressed together by seizing between the thumb and finger, and the hook ends $k$ depressed within the tail fin flange $d$ and the trolling hook is ready for casting. No hooks or engaging projections are exposed to engage weeds or other objects while being drawn through the water. The light metal plate 2 acts as sufficient weight to retain the body section 1 in its upright natural position, guided by the tail fin $c$, while the light wood body 1 will prevent the trolling hook from sinking beneath the surface of the water, and when properly made the object resembles an actual fish decoy, and as soon as the fish decoy body is seized by a live fish, the closing of the fish jaws over the decoy body 1 will instantly depress the trip bar 10 and release both the outwardly expanding spring hook arms $n$, the pointed hook sections $k$ coming into direct contact with the fish throat or mouth walls, instantly pierces same and prevents any escape of the fish when once seized. The hooks may be easily released from the fish by again depressing the hook arms together, as this type of trolling hook requires no point beards, the reaction of the outwardly expanding spring hooks being sufficient.

While I have shown my trolling hook formed as a fish body, it is to be understood that any other form which resembles any suitable fish bait may be used as well, and that various modifications of both shape and mechanical details may be made without departing from the spirit of my invention, and I claim not only the design as herein shown, but any other design that is substantially a substitution of parts herein shown.

Having fully described my automatic trolling hook, what I claim as my invention and desire to secure by Letters Patent is:

1. A trolling hook for fishing, comprising a body member suitable for attachment to the end of a trolling line, a pair of outwardly expanding spring hook members mounted on the under side of said body near the head thereof and capable of being closed together beneath the body member and wholly concealed thereby, a hook flange formed around the tail section of said body capable of engaging and retaining said hook members in their closed position beneath said body, and a trip lever pivotally mounted on the said body member and positioned to engage with said hook members and disengage said hook members from the tail hook flange when said trip lever is depressed and allowing said spring hooks to instantly expand outwardly.

2. A trolling hook for fishing, comprising a body member made of wood suitable for attachment to the end of a trolling line, a metal plate mounted on the bottom of said body member and formed with a hook flange around the tail section thereof, a pair of outwardly expanding hooks mounted at the head end of said body, engaging the metal plate and positioned therein to be closed beneath the body member, said hooks being positioned to engage the tail hook flange and to be retained therein in their closed position, and a trip lever pivotally mounted on said metal plate and positioned to engage the hook members in their closed position and disengage them from the said hook flange when the trip lever is depressed against the body member for allowing said expanding hooks to instantly spring outwardly when released.

3. A trolling hook for fishing, comprising a wood body member formed to resemble a fish and provided with means for attaching the head end to a trolling line, a metal plate mounted along the bottom side of said fish body and securely attached thereto, said metal plate being formed with a hook flange around the tail section thereof, a pair of outwardly expanding spring hooks mounted at the head end of said fish body member, engaging the metal plate section and positioned to be closed together beneath the fish body and completely concealed thereby, said hook members engaging the tail hook flange for retaining the hooks therein in their closed position, and a trip lever pivotally mounted lengthwise of said metal plate capable of being depressed toward said fish body member and with the opposite lever end positioned to engage the ends of the double spring hooks when the same are closed within the tail hook flange and disengage said hooks from the flange whenever said trip lever is so depressed against the body member, allowing the double hook members to instantly expand outwardly when released.

JOHN BOYKO.